(12) United States Patent
Herrera et al.

(10) Patent No.: US 9,939,545 B2
(45) Date of Patent: Apr. 10, 2018

(54) COMMUNICATION SYSTEM HAVING PROXIMITY DETECTOR OF FERROUS MATERIALS

(71) Applicant: MOTOROLA SOLUTIONS, INC, Schaumburg, IL (US)

(72) Inventors: Richard Herrera, Plantation, FL (US); Vernon A. Allen, Ft. Lauderdale, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 569 days.

(21) Appl. No.: 14/292,191

(22) Filed: May 30, 2014

(65) Prior Publication Data
US 2015/0346372 A1    Dec. 3, 2015

(51) Int. Cl.
*G01R 33/09* (2006.01)
*G01V 3/08* (2006.01)
*H04B 1/3827* (2015.01)
*G01V 13/00* (2006.01)

(52) U.S. Cl.
CPC ............. *G01V 3/08* (2013.01); *G01V 13/00* (2013.01); *H04B 2001/3855* (2013.01)

(58) Field of Classification Search
CPC ............. G01V 3/08; G01R 33/02; H04B 7/00
See application file for complete search history.

(56) References Cited

U.S. PATENT DOCUMENTS

| | | | |
|---|---|---|---|
| 3,822,694 A | 7/1974 | Mills | |
| 4,488,113 A | 12/1984 | Heemstra | |
| 5,233,759 A * | 8/1993 | Gloor | G01C 17/06 33/346 |
| 5,277,195 A * | 1/1994 | Williams | A61B 5/0876 482/13 |
| 5,376,921 A | 12/1994 | Trikilis | |
| 5,479,149 A * | 12/1995 | Pike | F41C 33/0209 340/539.1 |
| 5,528,067 A * | 6/1996 | Farb | G01R 33/07 257/401 |
| 5,825,293 A | 10/1998 | Ahmed et al. | |
| 7,116,940 B2 * | 10/2006 | Dvorak | H04B 1/385 379/430 |

(Continued)

OTHER PUBLICATIONS

Choi et al., "A Magnetically Excited and Sensed MEMS-Based Resonant Compass", IEEE Transactions on Magnetics, vol. 42, No. 10, Oct. 2006, pp. 3506-3508.

*Primary Examiner* — Vinh Nguyen
*Assistant Examiner* — Alvaro Fortich
(74) *Attorney, Agent, or Firm* — Barbara R. Doutre

(57) ABSTRACT

A metal detection system for a portable radio is provided. The metal detection system comprises a magnet coupled to a substrate, such as a belt, the magnet generating a magnetic field. The system further comprises a magnetometer coupled to the substrate, the magnetometer measuring changes in the magnet's magnetic field strength indicative of metal accessories being within a predetermined proximity of the magnet. The removal of accessories, such as law enforcement accessories (for example handcuffs) can be detected. The portable radio detects changes to the magnetic field in response to changes in location of the metal accessories. The portable radio can transmit a signal in response to accessories being removed from the substrate.

3 Claims, 3 Drawing Sheets

(56) References Cited

U.S. PATENT DOCUMENTS

| | | | |
|---|---|---|---|
| 7,239,134 B2 | 7/2007 | McClure et al. | |
| 7,714,720 B2* | 5/2010 | Hietanen | F41A 17/063 224/243 |
| 8,159,218 B2* | 4/2012 | Bolle | G01R 33/0052 29/592.1 |
| 2004/0170270 A1* | 9/2004 | Takashima | G01D 5/145 379/363 |
| 2009/0167295 A1* | 7/2009 | Chen | G01C 17/30 324/202 |
| 2009/0231144 A1* | 9/2009 | Dahl | G01V 3/15 340/573.1 |
| 2010/0237859 A1 | 9/2010 | Kotter et al. | |
| 2010/0315080 A1 | 12/2010 | Duncan et al. | |
| 2011/0138641 A1* | 6/2011 | Martinez Lozares | G01C 17/08 33/364 |
| 2012/0170177 A1* | 7/2012 | Pertuit | G01R 33/0023 361/679.01 |
| 2013/0127455 A1* | 5/2013 | Ettelt | G01R 33/093 324/252 |
| 2014/0087707 A1* | 3/2014 | Gustafsson | H04W 52/0254 455/418 |
| 2014/0159713 A1* | 6/2014 | Nersessian | G01R 33/0385 324/244 |
| 2015/0049426 A1* | 2/2015 | Smith | A45C 11/00 361/679.27 |

* cited by examiner

COMMUNICATION SYSTEM HAVING PROXIMITY DETECTOR OF FERROUS MATERIALS

TECHNICAL FIELD

The present application relates generally to metal detection systems and more particularly to a wearable metal detector that detects proximity of ferrous materials as part of a communication system.

BACKGROUND

Public safety personnel often utilize portable battery operated radios and carry a wide variety of public safety accessories, such as a gun, handcuffs, metal canister (pepper spray) and other ferrous material accessories. The ability to detect the presence or absence of such accessories is considered desirable. Existing analog based metal detection electronics require the use of large coils and analog components which take up a tremendous amount of real estate on a printed circuit board, and as such are not appropriate for portable communication systems.

Accordingly, there is a need to provide proximity detection of ferrous materials as part of a portable communication system.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
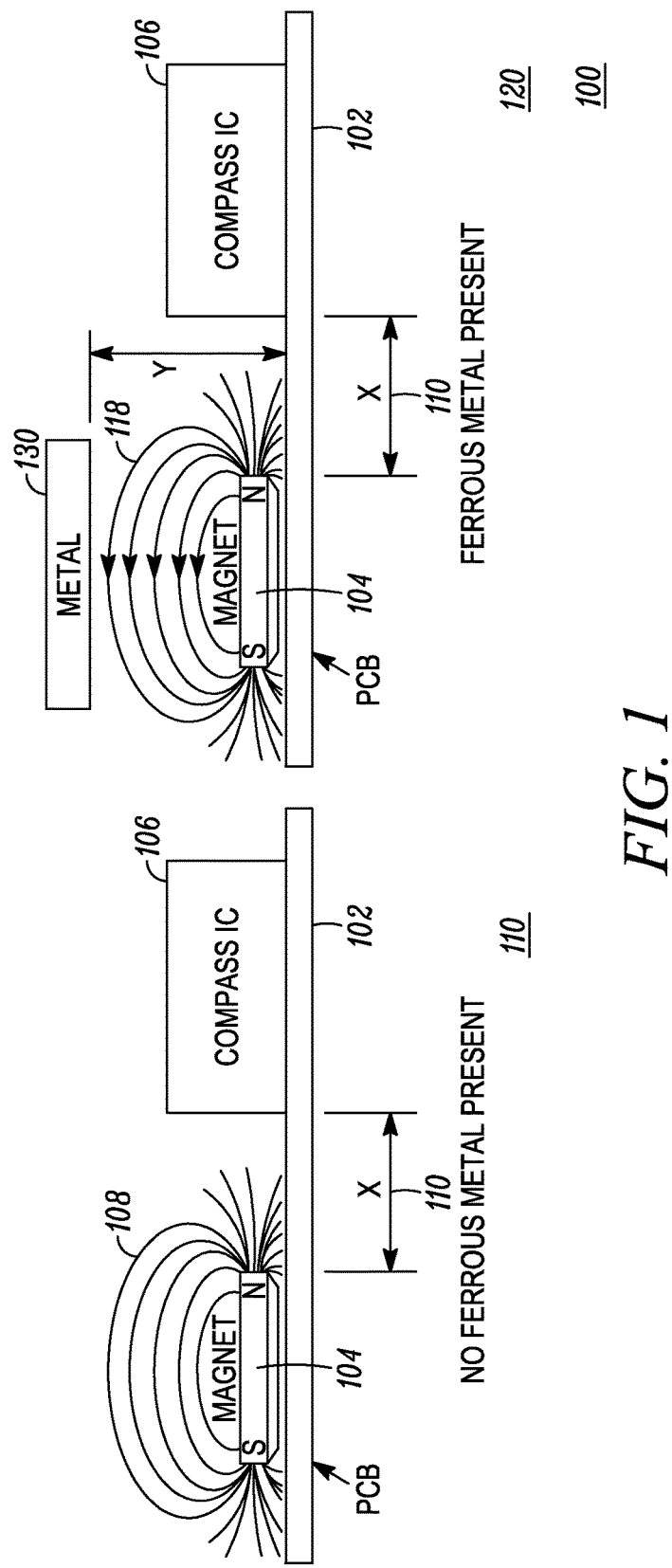
FIG. 1 is a metal detection system formed in accordance with the various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the embodiments of shown.

The apparatus and method components have been represented where appropriate by conventional symbols in the drawings, showing only those specific details that are pertinent to understanding the embodiments shown so as not to obscure the disclosure with details that will be readily apparent to those of ordinary skill in the art having the benefit of the description herein. Other elements, such as those known to one of skill in the art, may thus be present.

DETAILED DESCRIPTION

Before describing in detail embodiments of the invention, it should be observed that such embodiments reside primarily in combinations of apparatus components related to a metal detection system, and further the incorporation of the metal detection system as part of a portable, wearable communication system.

In accordance with the various embodiments, electronic metal detection is achieved through the use of a magnetometer, also referred to as a compass integrated circuit (IC), in a wearable portable communication system. In the past, the compass IC has typically been used to detect the earth's magnetic field strength for navigation purposes. However, the earth's variable magnetic reference presents challenges for reliable metal detection especially in a wearable portable system where a user moves in all directions. Another challenge is that the earth's magnetic field is weak and limits how far a compass IC can detect the presence of a ferrous metal. In accordance with the various embodiments, the capabilities of the compass IC have been advantageously exploited to detect proximity of ferrous materials through the use of a permanent magnet, as opposed to the use of the earth's magnetic field.

FIG. 1 is a metal detection system 100 formed in accordance with the various embodiments. In accordance with the various embodiments, the metal detection system 100 comprises a substrate 102, a magnet 104, and a magnetometer 106, shown as a compass IC. The magnetometer 106 is coupled to the substrate 102 and separated by a predetermined distance (x) 110 from the magnet 104 to register changes in the magnet's magnetic field. Two views 110, 120 of the system 100 are shown. In view 110, the magnet 104 generates an undisturbed magnetic field 108. In accordance with the various embodiments, and as shown in view 120, the magnetometer 106 measures the strength of the magnetic field 118 generated by the magnet 104 indicative of a metal object or an object having ferrous properties 130 being brought within a predetermined distance "y" of the magnet. In accordance with the various embodiments, the magnetometer 106 measures magnetic field strength as an indicator of metal being proximate to or moved away from metal detector 100.

The metal detection system of the various embodiments provides a robust approach of metal detection through the use of the permanent magnet 104 as a magnetic reference located at the fixed distance (x) 110 from the magnetometer 106. The permanent magnet 104 provides predetermined field strength for a detection range greater than earth magnetic field. The permanent magnet's predetermined field strength is fixed in strength and direction. In accordance with the various embodiments, magnetic field disturbances, such as disturbance 118, can now be reliably detected when a ferrous material is introduced close to the magnet 104 thus providing a reliable means of metal detection.

Figure 2:
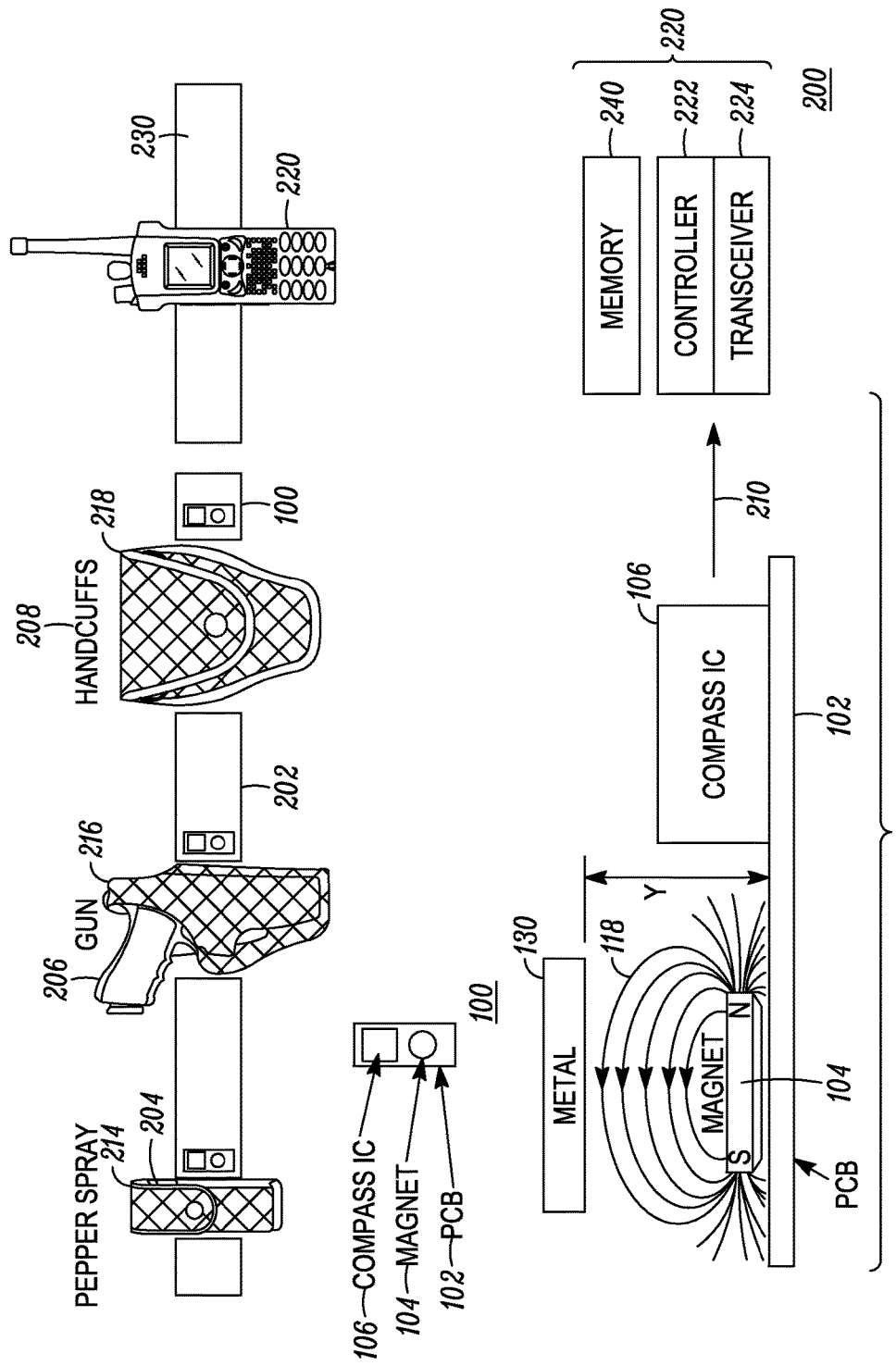
FIG. 2 shows a portable, wearable communication system formed in accordance with the various embodiments.

The magnetometer 106 provides a predetermined level of sensitivity and thus both undisturbed magnetic fields 108 and disturbed magnetic fields 118 can be detected by changes in measured magnetic field strength. Thus, system 100 avails itself well to detecting the presence of a ferrous material object in proximity to the magnet 104 as well as detecting when a ferrous material object has been removed away from the magnet. The magnetometer 106 is an electronic device that can communicate with other electronic devices to provide an indicator of disturbed and undisturbed magnetic fields indicative of the presence or absence of a metal object. FIG. 2 will further describe such an embodiment.

FIG. 2 shows a portable, wearable communication system 200 formed and operating in accordance with the various embodiments. System 200 comprises a plurality of metal detectors 100 formed in accordance with metal detection system of FIG. 1. In accordance with the various embodiments, the plurality of metal detectors 100 are coupled to a body worn accessory 230. The body worn accessory 230 is shown here as a belt, however many other types of body worn accessories such as a vest, a harness, a holster or the like may also be suitable. The plurality of metal detectors 100 may be attached to or within the body worn accessory 230. Each metal detector 100 comprises, as was described in FIG. 1, substrate 102 having magnet 104 and magnetometer 106 coupled thereon and separated by a predetermined distance. The magnetometer 106 is located adjacent to the permanent magnet 104 for measuring the magnetic field strength of the magnet.

A plurality of attachable and removable accessory devices having ferrous properties and typically used by public safety officers are located on the body worn accessory 230. The plurality of accessory devices may thus comprise for example, a plurality of police accessories, such as a canister 204, gun 206, and handcuffs 208. Each of the plurality of accessory devices 204, 206, 208 having ferrous properties is located in proximity to one of the plurality of metal detectors 100 to generate predetermined magnetic fields, such as magnetic field 118, for each respective accessory device. The body worn accessory 230 further accommodates a communication device, such as shown in FIG. 2 as a portable radio 220. Portable radio 220 comprises a controller 222, a transceiver 224 and other suitable circuitry for operating in a public safety communication network.

In this example, the portable radio 220 is shown coupled the body worn accessory 230 embodied as a belt, such as worn by an officer or other individual needing to utilize and/or keep track of the many metal accessory devices. The belt 230 accommodates the plurality of accessories having ferrous properties, shown here as pepper spray canister 204 held in holder 214, a gun 206 held in holster 216 and handcuffs 208 held in pouch 218. Alternatively, each of the plurality of accessories 204, 206, 208 may be coupled to the belt directly via a belt clip or other retention mechanism which allows the user easy access to remove the items quickly. Each of these accessories has metal properties which, when located in proximity with its respective metal detector 100 disturbs the fixed (reference) magnetic field generated by the magnet 104 causing the magnetometer to read a predetermined field strength stored in a look up table in the electronics memory 240. An example is shown as metal 130 (such as metal from one of the accessories 204, 206, or 208) is associated with magnetic field 118. Magnetometer 106 measures the field strength from the magnet 104 with the metal present and detects changes in the field strength when the metal is removed. In this view, signal 210 represents the magnetic field strength 118 received at portable radio 220. Thus, portable radio 220 is made aware that a metal accessory is on the belt 230 as the metal accessory is within proximity of the magnet 104, and the magnet generating the magnetic field 118.

Removal of the accessory changes the magnetic field and returns the field to an undisturbed condition. Each of the plurality of metal detectors 100 generates a signal, such as signal 210, to the portable radio 230 indicating a change in one of the magnetic fields in response to one of the plurality of accessories (204, 206, or 208) being removed from the body worn accessory.

In accordance with another embodiment, the magnet 104 may be removable from the system to enable the magnetometer 106 to operate in a compass navigation mode. In accordance with another embodiment, the magnetometer 106 may be selectively controlled by the portable radio 220 to operate as a navigational device in a first mode of operation and as a metal detector in a second mode of operation.

While the distance (e.g. distance "x" 110 of FIG. 1) between the magnet and magnetometer is typically fixed, it is possible that the distance between the magnet and the compass IC is adjustable. The adjustable distance enables calibration by compensating for magnet strength and magnetometer sensitivity. For example, when a plurality of different metal accessories are attached to the belt 230, the magnetic field 118 may be unique for each device and the strength of this field being measured by the magnetometer 206 can be varied dependent on that adjusted distance. This can help distinguish, for example removal of a gun accessory from removal a handcuff accessory.

The removal detection may further be based on time, providing notifications to dispatch after a predetermined time has lapsed. For example, the magnet 104 may exhibit first and second magnetic field disturbances (no disturbances for the absence of near metal) respectively in response to the presence or absence in response to the presence or absence of the accessory (204, 206, 208) being on the belt 230. But, the portable radio 220 may generate signal 210 in response to the detection of the second magnetic field, representing removal of the metal accessory, for a predetermined time. As such, false triggering of the radio can be avoided in situations where an officer is simply adjusting the metal accessories, such as within holsters 216, 218 and 214.

In accordance with a further embodiment, a memory device 240 may be located within the portable radio 220, the memory device for storing magnetic field values associated with metal devices located proximate to the permanent magnet 104. The magnetometer 106 can then detect changes in the magnetic field 118 in response to changes in location of the metal devices. The portable radio 220 can further transmit signals in response to changes in the magnetic field 118 detected by the magnetometer 106 that are different from the magnetic field values stored in the radio's memory.

In accordance with another embodiment, the magnetometer 106 can also be coupled to the communication device 220 (as opposed to the belt 230) for selectively providing navigational indicators and measuring the disturbance to the earth magnetic field in response to a ferrous material coming within a predetermined distance of the magnetometer.

Figure 3:
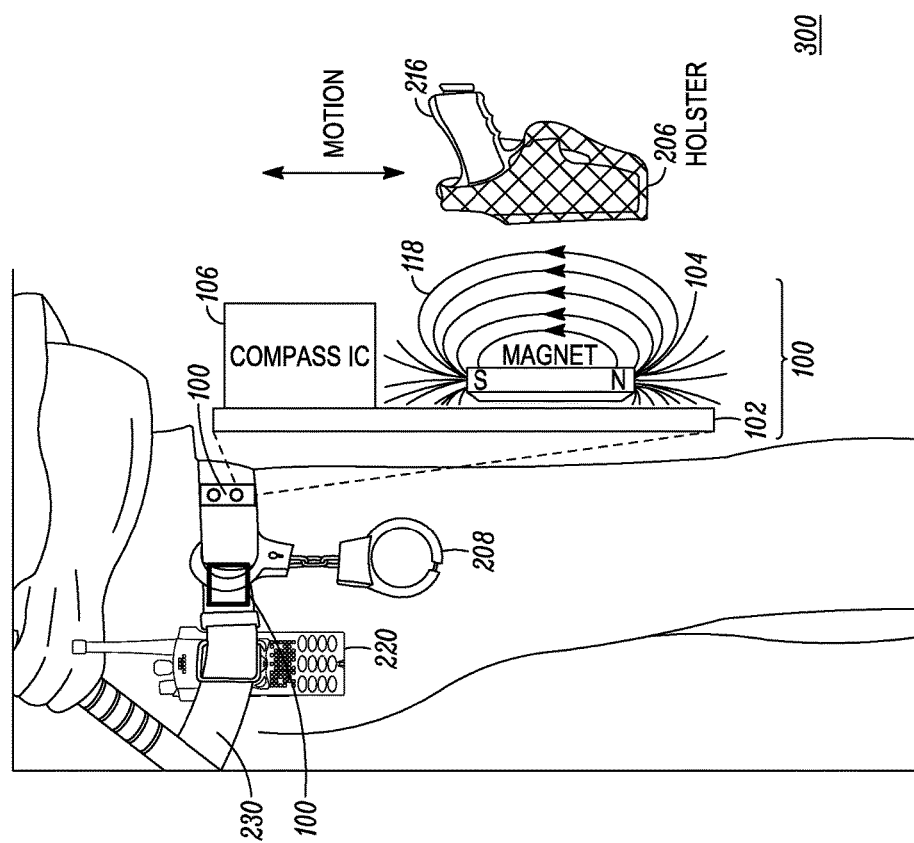
FIG. 3 shows a communication system formed and operating in accordance with the various embodiments.

FIG. 3 shows an example of a communication system 300 formed and operating in accordance with the various embodiments. System 300 comprises a portable radio 220 worn on a belt 230. An accessory having metal properties, such as a gun within holster 216 and/or handcuffs 208 is worn on the belt. The accessory or accessory being attachable and removable from the belt 230. The metal detector 100 formed in accordance with the various embodiments is worn on the belt 230, the metal detector comprising magnet 104 and magnetometer 106. In accordance with the various embodiments, the magnetometer 106 is electronically coupled to the portable radio 220. The magnetometer 106 provides a signal to the portable radio indicating a change in magnetic field 118 in response to the accessory being removed from or attached to the belt 230. As mentioned previously, the portable radio 220 generates a signal based on magnetic field strength in response to detection of the second magnetic field representing removal of the metal accessory for a predetermined time. This signal may notify the user that an accessory has been removed but can further notify a dispatch station or other network station, if for example, the officer's gun has been removed for an extended period of time with no call for assistance, indicative of perhaps an officer in danger. As seen in this embodiment, the accessory may comprises one or more of: metal handcuffs, a metal gun, or a metal canister or other device having ferrous properties to be worn on the belt 230.

The metal detectors and wearable detection systems 100, 200 provided by the embodiments beneficially provides an improved metal detection range over that of the earth's magnetic field as a reference. The system provides a reliable magnetic source for metal detection and is particularly advantageous when used as part of a wearable system having one or more accessories having ferrous materials, such as handcuffs, gun, canister, to name a few. The metal detection of the various embodiments avoids the use of large coils which take up large amounts of real estate and higher current drain. The use of the permanent magnet as a reference magnetic field eliminates errors associated with variations in the earth's magnetic field. The metal detection system is particularly advantageous for portable battery operated electronic products used in public safety environments which tend to be moved from place to place. The minimal number of piece parts makes the system easy to manufacture and cost effective.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure and Summary section are provided to allow the reader to quickly ascertain the nature of the technical disclosure. It is submitted with the understanding that neither will be used to interpret or limit the scope or meaning of the claims. In addition, in the foregoing Detailed Description, it can be seen that various features are grouped together in some embodiments for the purpose of streamlining the disclosure. This method of disclosure is not to be interpreted as reflecting an intention that the embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Those skilled in the art will recognize that a wide variety of modifications, alterations, and combinations can be made with respect to the above described embodiments without departing from the spirit and scope of the invention and that such modifications, alterations, and combinations are to be viewed as being within the scope of the inventive concept. Thus, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims issuing from this application. The invention is defined solely by any claims issuing from this application and all equivalents of those issued claims.

The invention claimed is:

1. A communication system, comprising:
   a portable radio;
   a body worn accessory for carrying a plurality of police accessories;
   a plurality of metal detectors coupled to the body worn accessory, each metal detector comprising a magnet and a magnetometer;
   the plurality of police accessories having ferrous properties, each of the plurality of police accessories located in proximity to and associated with one of the plurality of metal detectors, each magnet generating a predetermined respective magnetic field strength for each police accessory; and
   each of the plurality magnetometers generating a signal to the portable radio indicating a change in one of the magnetic field strength in response to one of the plurality of police accessories being removed from the body worn accessory.

2. The communication system of claim 1, wherein the body worn accessory comprises at least one of: a belt, a vest, a harness, or a holster.

3. The communication system of claim 1, wherein the magnet and magnetometer for each metal detector are adjacently located on a single substrate.

* * * * *